United States Patent [19]
Johnson et al.

[11] Patent Number: 5,956,508
[45] Date of Patent: Sep. 21, 1999

[54] CREATION OF MANAGEABLE MANAGEMENT COLLECTIONS USING FILTERS

[75] Inventors: Wanda K. Johnson; Charles R. McKelley, Jr.; Jerry W. Malcolm; Troy G. Reish; Robert F. Selby, all of Austin, Tex.

[73] Assignee: International Business Machines Corporation, Armonk, N.Y.

[21] Appl. No.: 08/838,469

[22] Filed: Apr. 7, 1997

Related U.S. Application Data

[63] Continuation of application No. 08/297,188, Aug. 26, 1994, abandoned.

[51] Int. Cl.[6] ............................................... G06F 9/40
[52] U.S. Cl. ............................................................. 395/683
[58] Field of Search .......................... 395/200.1, 200.11, 395/680–683

[56] References Cited

U.S. PATENT DOCUMENTS

| | | | |
|---|---|---|---|
| 4,791,561 | 12/1988 | Huber | 171/232 |
| 4,792,888 | 12/1988 | Agarwal et al. | 627/39 |
| 4,823,283 | 4/1989 | Diehm et al. | 918/458 |
| 4,831,552 | 5/1989 | Scully et al. | 8/34 |
| 4,937,743 | 6/1990 | Rassman et al. | 96/27 |
| 4,962,463 | 10/1990 | Crossno et al. | 214/221 |
| 4,972,504 | 11/1990 | Daniel, Jr. et al. | 455/2 |
| 4,991,076 | 2/1991 | Zifferer et al. | 364/147 |
| 5,021,967 | 6/1991 | Wexelblat et al. | 271/91 |
| 5,049,873 | 9/1991 | Robbins et al. | 340/825.06 |
| 5,101,348 | 3/1992 | Arrowood et al. | 395/200 |
| 5,121,475 | 6/1992 | Child et al. | 492/386 |
| 5,133,075 | 7/1992 | Risch | 286/556 |
| 5,148,154 | 9/1992 | Mackay et al. | 622/821 |
| 5,179,657 | 1/1993 | Dykstal et al. | 866/964 |
| 5,187,787 | 2/1993 | Skeen et al. | 395/600 |
| 5,204,955 | 4/1993 | Kagei et al. | 395/575 |
| 5,208,907 | 5/1993 | Shelton et al. | 540/382 |
| 5,241,645 | 8/1993 | Cimral et al. | 395/500 |
| 5,247,611 | 9/1993 | Norden-Paul et al. | 689/135 |
| 5,257,349 | 10/1993 | Alexander | 628/872 |
| 5,295,244 | 3/1994 | Dev | 395/200.11 |
| 5,317,730 | 5/1994 | Moore et al. | 395/600 |
| 5,369,702 | 11/1994 | Shanton | 380/4 |
| 5,546,540 | 8/1996 | White | 395/200.1 |
| 5,680,563 | 10/1997 | Edelman | 395/348 |
| 5,682,523 | 10/1997 | Chen et al. | 1/1 |
| 5,734,903 | 3/1998 | Saulpaugh et al. | 395/683 |
| 5,787,252 | 11/1995 | Schettler et al. | 395/200.54 |

FOREIGN PATENT DOCUMENTS

0518573A2 5/1992 European Pat. Off. .

OTHER PUBLICATIONS

Lynch–Freshner et al., "NewWave computer–based training development facility", Hewlett–Packard Journal, v40,n4, p. 48(9), Aug. 1989.

Orfali, "Essential Client/Server Survival Guide", Van Nostrand Reinhold, pp. 32–35, 367–381, 439–441, 1994.

Kim, David, "The Internetwork Manger's Survival Guide," LAN Magazine, p. (7), Apr. 1994.

Anderson, David B., *Experience With Flamingo: A Distributed Object–Oriented User Interface System*, OOPSLA '86 Proceedings, Sep. 1986, pp. 177–185.

*Primary Examiner*—Alvin E. Oberley
*Assistant Examiner*—St. John Courtney, III
*Attorney, Agent, or Firm*—Jeffrey S. LaBaw; Jack V. Musgrove; Andrew J. Dillon

[57] ABSTRACT

A data processing system for managing a plurality of objects within said data processing system, the distributed data processing system having an object oriented environment. A container object is created for holding objects and a plurality of objects is detected within the data processing system. A filter object is associated with the container object, wherein the filter object receives the plurality of objects within the data processing system and the filter object passes selected ones of the plurality of objects to the container object. The data processing system is periodically monitored to detect changes in the plurality of objects. The container object is automatically updated using the filter object to pass selected ones of the plurality of objects to the container object in response to monitoring the data processing system, wherein the container object is automatically updated.

14 Claims, 11 Drawing Sheets

CREATION OF MANAGEABLE MANAGEMENT COLLECTIONS USING FILTERS

This is a continuation of application Ser. No. 08/297,188, filed Aug. 26, 1994, now abandoned.

BACKGROUND OF THE INVENTION

1. Technical Field

The present invention relates generally to an improved data processing system and in particular, to an improved method and system for managing objects within a data processing system. More specifically, the present invention relates to an improved method and system for managing partitioning large numbers of objects in a data processing system into manageable subsets.

2. Description of the Related Art

The manipulation of data in a data processing system is well known in the prior art. Data may be manipulated in many ways in a modern data processing system including: data accessing, data decoding, data communication, data compression, data conversion, data entry, data exchange, data filing, data linking, data locking, data mapping, data modeling, data recording, data sorting, and data transferring. The large amounts of data which are available to the user of a modern data processing system often become overwhelming in magnitude and complexity.

As a result of the increasing complexity of data processing systems, attempts have been made to simplify the interface between a user and the large amounts of data present with in a modern data processing system. One example of an attempt to simplify the interface between a user and a data processing system is the use of a so called Graphical Using Interface (GUI) to provide an intuitive and graphical interface between the user and the data processing system. The Common User Access (CUA) user interface is one example of such a GUI. "Common User Access" is a trademark of International Business Machines Corporation. The CUA user interface is often employed to organize and present large amounts of data to a user in a graphical and intuitive manner. One situation in which large amounts of data may be presented to a user involves modern distributed data processing systems.

Modern distributed data processing systems, also called networks, may consist of hundreds or thousands of computing devices of various kinds, often manufactured by different venders and interconnected by many types of transmission media, including telephone lines, satellites, digital microwave radio, optical fibers, or digital data lines. They may include local or wide area configurations. Administrators managing a network require an ability to determine the status of the various computing devices within the network in order to monitor and manage resources within the network. Currently, an administrator may view various components within the network in the form of nodes or icons displayed at the administrator's station. As the number of nodes (computers or other data processing systems) increase, the display becomes more cluttered and information is harder to discern.

Therefore, it would be advantageous to have a method and system for managing large amounts of data or objects within a data processing system.

SUMMARY OF THE INVENTION

It is one object of the present invention to provide an improved data processing system.

It is another object of the present invention to provide an improved method and system for managing objects within a data processing system.

It is yet another object of the present invention to provide an improved method and system for managing data processing systems within a distributed data processing system.

The present invention provides a data processing system for managing a plurality of objects within said data processing system, the distributed data processing system having an object oriented environment. A container object is created for holding objects and a plurality of objects is detected within the data processing system. A filter object is associated with the container object, wherein the filter object receives the plurality of objects within the data processing system and the filter object passes selected ones of the plurality of objects to the container object. The data processing system is periodically monitored to detect changes in the plurality of objects. The container object is automatically updated using the filter object to pass selected ones of the plurality of objects to the container object in response to monitoring the data processing system, wherein the container object is automatically updated.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein;

DETAILED DESCRIPTION OF PREFERRED EMBODIMENT

Figure 1:
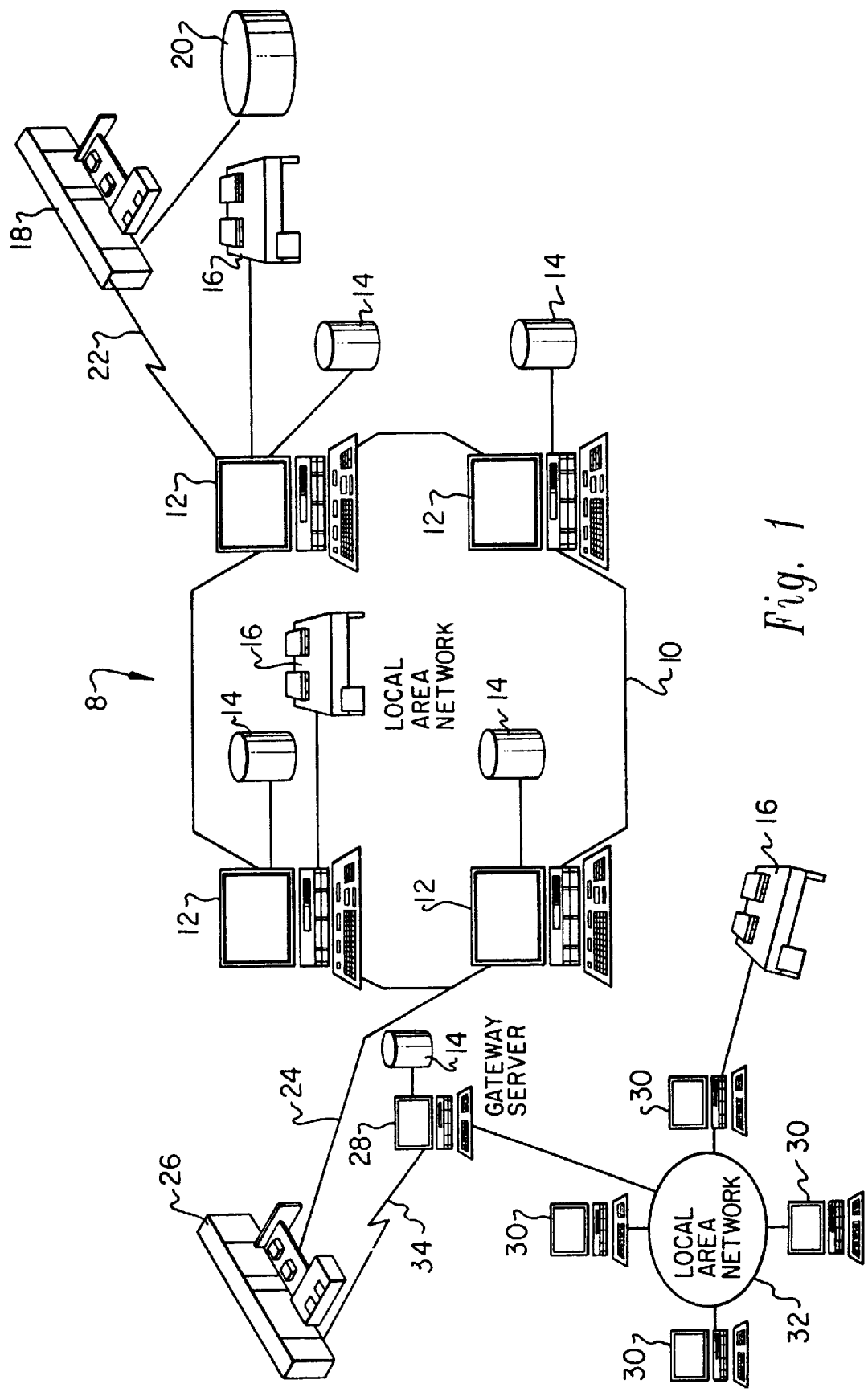
FIG. 1 depicts a pictorial representation of a data processing system that may be utilized to implement a method and system of the present invention.

With reference now to the figures, and in particular with reference to FIG. 1, there is depicted a pictorial representation of a data processing system 8 which may be utilized to implement a method and system of the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store documents or resource objects which may be periodically accessed by any user within data processing system 8. In a manner well known in the prior art, each such document or resource object stored within a storage device 14 may be freely interchanged throughout data processing system 8 by transferring a document to a user at an individual computer 12 or 32, for example.

Still referring to FIG. 1, it may be seen that data processing system 8 may also include multiple mainframe computers, such as mainframe computer 18, which may be preferably coupled to Local Area Network (LAN) 10 by means of communications link 22. Mainframe computer 18 may also be coupled to a storage device 20 which may serve as remote storage for Local Area Network (LAN) 10. Similarly, Local Area Network (LAN) 10 may be coupled via communications link 24 through a subsystem control unit/communications controller 26 and communications link 34 to a gateway server 28. Gateway server 28 is preferably an individual computer or Interactive Work Station (IWS) which serves to link Local Area Network (LAN) 32 to Local Area Network (LAN) 10.

As discussed above with respect to Local Area Network (LAN) 32 and Local Area Network (LAN) 10, a plurality of documents or resource objects may be stored within storage device 20 and controlled by mainframe computer 18, as Resource Manager or Library Service for the resource objects thus stored. Of course, those skilled in the art will appreciate that mainframe computer 18 may be located a great geographic distance from Local Area Network (LAN) 10 and similarly Local Area Network (LAN) 10 may be located a substantial distance from Local Area Network (LAN) 32. For example, Local Area Network (LAN) 32 may be located in California while Local Area Network (LAN) 10 may be located within Texas and mainframe computer 18 may be located in New York.

Figure 2A:
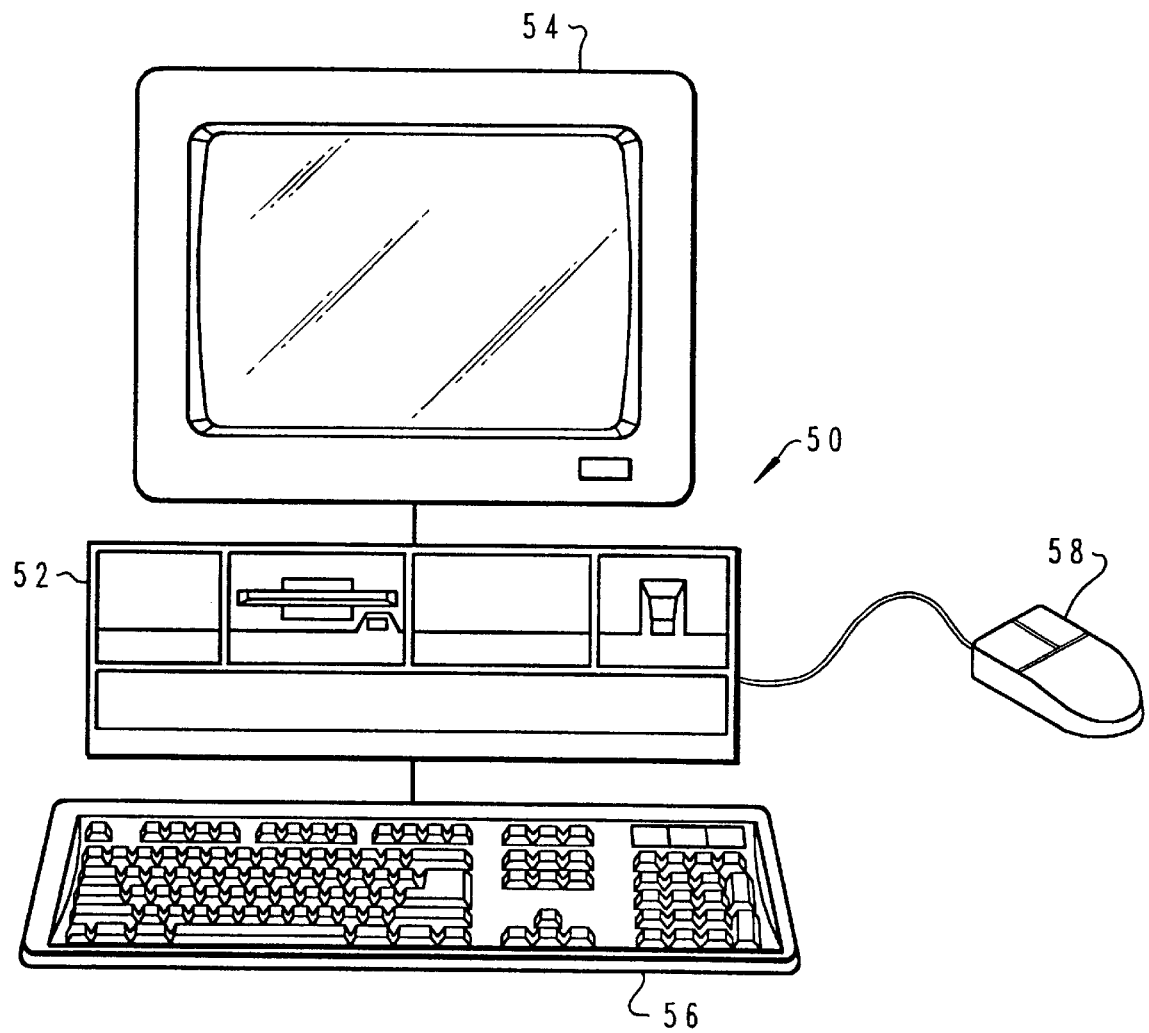
FIG. 2A is a personal computer connected to the data processing system depicted in FIG. 1 which may be utilized to implement a method and system of the present invention.

A high density tape data storage system may be found on individual computers 12 and 30, on gateway server 28, on some computer in LAN 10 or 32, or on mainframe computer 18. Individual computers 12 and 30 may be, for example, a computer 50 as depicted in FIG. 2A. As illustrated in FIG. 2A, computer 50 includes a system unit 52, a video display terminal 54, a keyboard 56, and a mouse 58. Computer 50 may be implemented utilizing any suitable computer such as the IBM PS/2 computer or an IBM RISC System/6000 computer, both products of International Business Machines Corporation (IBM), located in Armonk, N.Y. "RISC System/6000" and PS/2 are registered trademarks of International Business Machines Corporation. A preferred embodiment of the present invention may be implemented in other types of computer, such as for example, intelligent work stations or mini-computers.

Figure 2B:
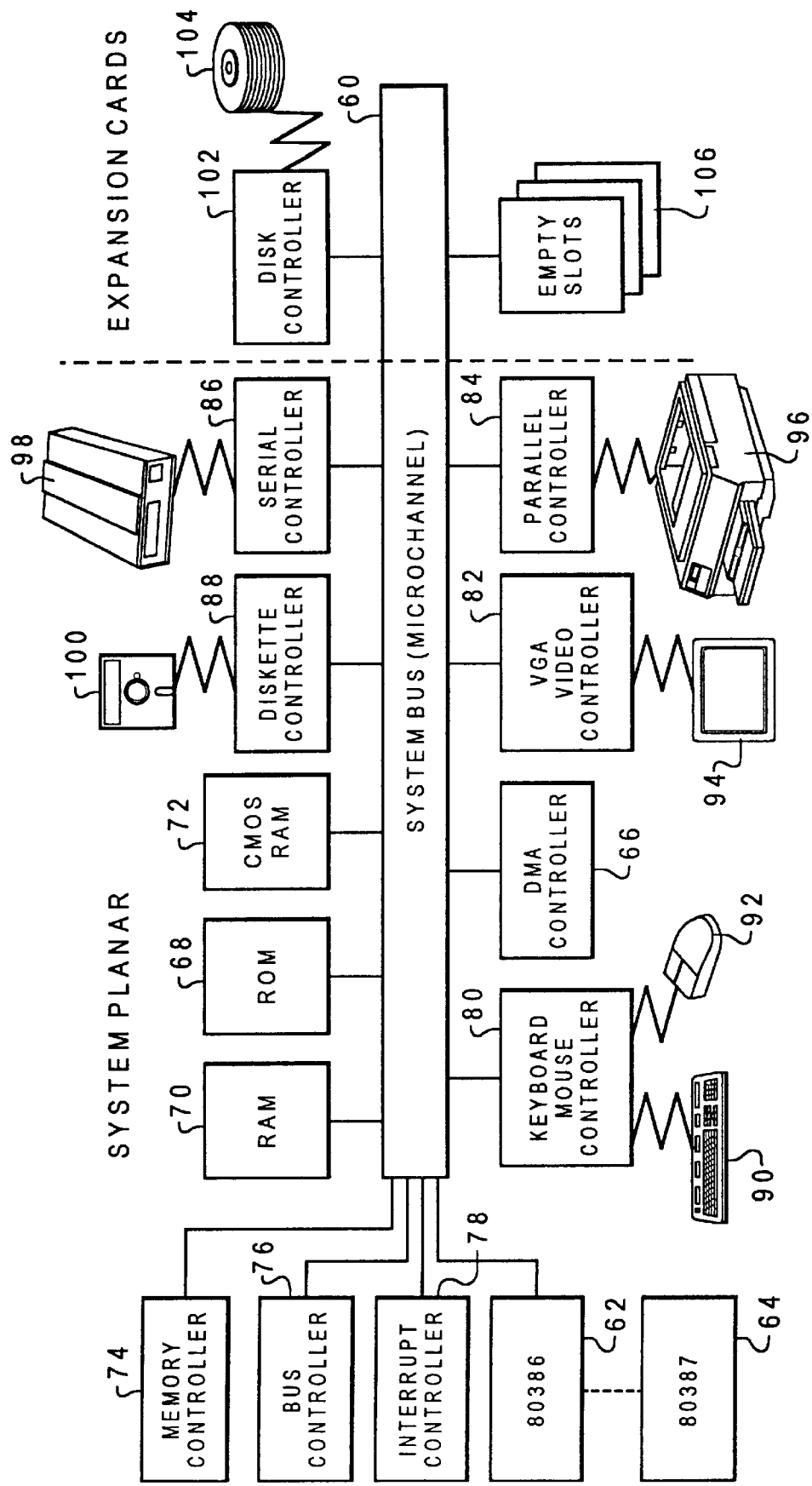
FIG. 2B depicts a block diagram of selected components in the personal computer illustrated in FIG. 1 in which a preferred embodiment of the present invention may be implemented.

Referring now to FIG. 2B, there is depicted a block diagram of selected components in computer 50 in which a preferred embodiment of the present invention may be implemented. System unit 52 preferably includes a system bus 60 for interconnecting and establishing communication between various components in system unit 52. Microprocessor 62 is connected to system bus 60 and also may have numeric coprocessor 64 connected to it. System bus 60 may be a Micro Channel system bus from IBM. "Micro Channel" is a registered trademark of International Business Machines Corporation. Direct memory access (DMA) controller 66 is also connected to system bus 60 and allows various devices to appropriate cycles from microprocessor 62 during large I/O transfers.

Read Only Memory (ROM) 68 and Random Access Memory (RAM) 70 are also connected to system bus 60. ROM 68 contains the power-on self test (POST) and the Basic Input/Output System (BIOS) which control hardware operations, such as those involving disk drives and the keyboard. ROM 68 is mapped into the microprocessor 62 address space in the range from 640K to 1 megabyte. CMOS RAM 72 is attached to system bus 60 and contains system configuration information.

Also connected to system bus 60 are memory controller 74, bus controller 76, and interrupt controller 78 which serve to aid in the control of data flow through system bus 60 between various peripherals, adapters, and devices. System unit 52 also contains various input/output (I/O) controllers such as: keyboard and mouse controller 80, video controller 82, parallel controller 84, serial controller 86, and diskette controller 88. Keyboard and mouse controller 80 provide a hardware interface for keyboard 90 and mouse 92. Video controller 82 provides a hardware interface for video display terminal 94. Parallel controller 84 provides a hardware interface for devices such as printer 96. Serial controller 86 provides a hardware interface for devices such as a modem 98. Diskette controller 88 provides a hardware interface for floppy disk unit 100. Expansion cards may also be added to system bus 60, such as disk controller 102, which provides a hardware interface for hard disk unit 104. Empty slots 106 are provided so that other peripherals, adapters, and devices may be added to system unit 52.

Those skilled in the art will appreciate that the hardware depicted in FIG. 2B may vary for specific applications. For example, other peripheral devices such as: optical disk media, audio adapters, or chip programming devices such as a PAL or EPROM programming device, and the like also may be utilized in addition to or in place of the hardware already depicted.

The development of application and system software for data processing systems has traditionally been a time consuming task. The field of software engineering has attempted to overcome the limitations of traditional techniques by proposing new, more efficient software development models. Object oriented programming has emerged as a promising technology that will allow rapid development, implementation and customization of each object which has certain data attributes and processes or methods that operate on that data. Data is said to be "encapsulated" by an object and can only be modified use of the object's methods which are invoked by sending a message to an object identifying the method and supplying any needed arguments.

Object oriented systems have two important properties in addition to encapsulation. "Inheritance" is the ability to derive a new object from an existing object and inherit all properties, including methods and data structure, from the existing object. The new object may have certain unique features which are supplied as overrides or modifications to the existing class, i.e. a new subclass needs to specify only the functions and data that distinguish that class from the existing more general class.

The ability to override an existing method description enables polymorphism, the ability to have a single message to an object be processed in different ways depending on the object itself.

Inheritance and polymorphism create a powerful structure for implementing new software systems. The software developer does not have to develop each piece of a system, he or she need only specify the unique features of the system.

The power of object oriented systems is realized through the development of system "frameworks." A framework is a collection of base classes that can be used by a system implementor to create a final systems product. The framework is defined and developed to work together as a system. Conceptually, the framework is much like a set of standard hardware components used by computer hardware builders. Each of the components has certain defined functions and interfaces and the engineer assembles these components according to a particular design to create a unique hardware system.

Figure 3:
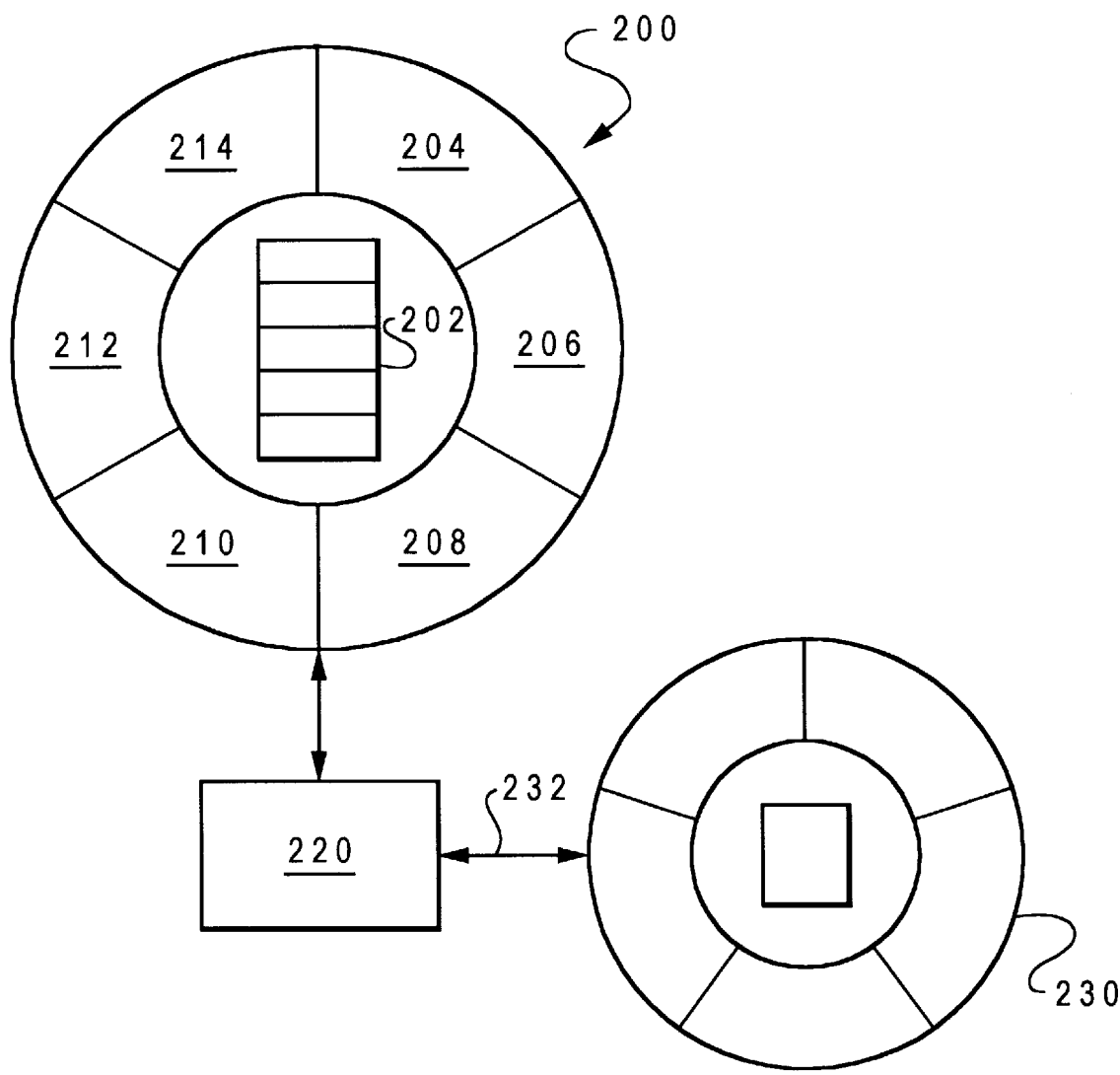
FIG. 3 is a diagram of objects in accordance with a preferred embodiment of the present invention.

An object encapsulates data and the methods needed to operate on that data. Objects can be represented by a "doughnut diagram" such as shown in FIG. 3. Object data is shown in the center 202 surrounded by the applicable methods 204 to 214. Data 202 may be modified only by the methods of that object. Methods 204–214 are invoked by receiving messages from other objects. A typical object oriented system will have a message router 220 that routes messages between objects. Thus, object 230 causes Method C 208 to be invoked by sending a message 232 to the message router that in turn sends it 222 to Method C 208 of object 200.

Object frameworks are constructed to provide a set of objects for application and system developers to use to construct a delivered system. The IBM System Object Model (SOM) framework, for example, provides a language independent set of objects for use in systems development. The IBM System Object Model (SOM) framework, for example, provides a language independent set of objects for use in systems development. LAN NetView Manage is an example of a product from International Business Machine Corporation developed using such an environment. "LAN NetView Manage" is a trademark of International Business Machines Corporation.

Objects are grouped into classes of related objects. The class description contains information relevant to all objects in a class, including a description of instance variables maintained by each of the objects and the available object methods. An object instance is created (or "instantiated") based on that information and has the properties defined in the object class. For example, the object class DOG can include the instance variables "dog_type" and "dog_name" and a "bark" method implementing the response to a bark message. An instance of dog, e.g. ROVER, will maintain the type and name instance variables for itself and will respond to the bark message.

Abstract classes are used to describe the interfaces and methods expected to be used by a class without providing detail on the implementation of those methods. Abstract classes are useful in frameworks where the implementation details are to be left to the implementor. Concrete classes are created as subclasses of abstract classes and implement those classes.

Figure 4:
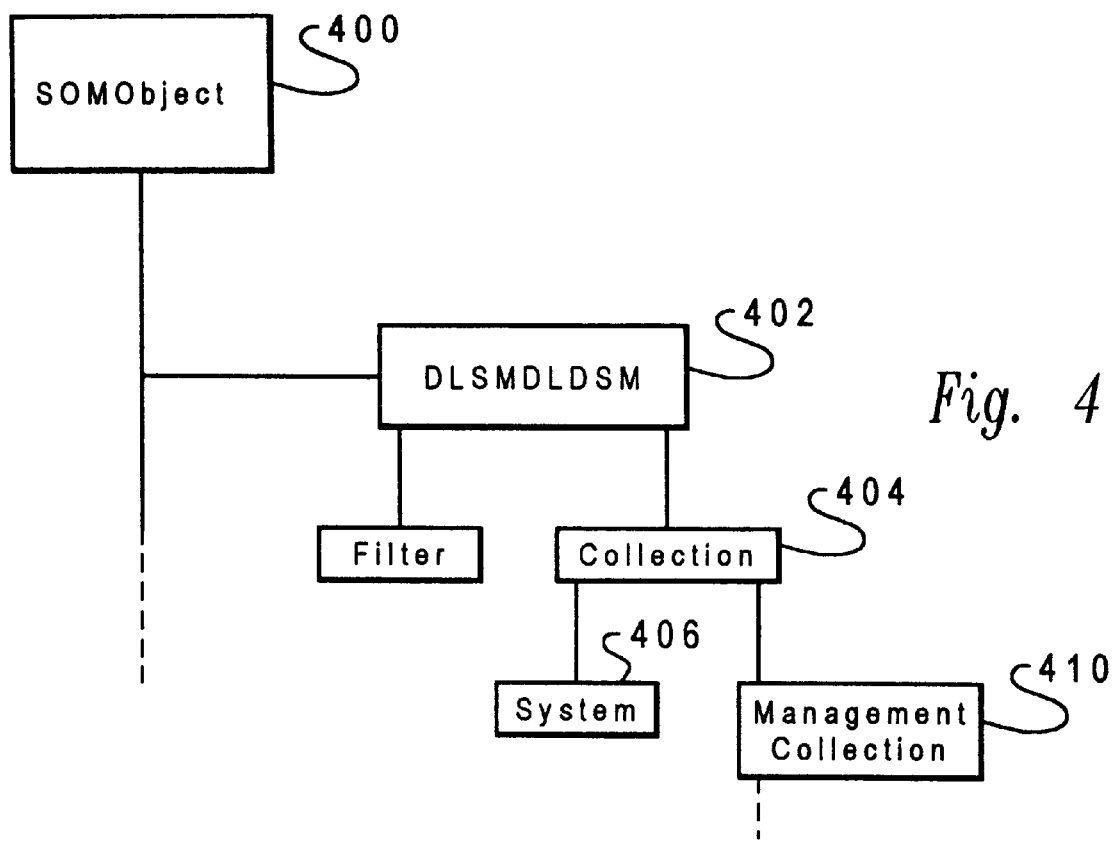
FIG. 4 illustrates class hierarchy for objects used in managing systems within a data processing system using the System Object Model in accordance with a preferred embodiment of the present invention.

Classes in an object oriented system are often derived from some single base class. This base class is named "SOMObject" in the IBM System Object Model. FIG. 4 illustrates the preferred embodiment of the present invention by showing the class hierarchy for objects used in managing systems within a data processing system using the System Object Model. The class "DLSMDLDSM" 402 is a subclass of "SOMobject" 400 and is the generic group class in accordance with a preferred embodiment of the present invention. The class "Collection" 404 is a subclass of DLSMDLDSM 402. Subclasses "System" 406 and "Management Collection" 410 are subclasses of Collection 404. System 406 includes a list of running processes, error logs, etc. for a data processing system such as the one depicted in FIG. 1. The class "Filter" 408 is a subclass of DLSMDLDSM 402.

Each Filter class implements a method, which takes the input list from All Systems Management Collection 406 and returns a subset lists of objects matching a filter criteria in accordance with a preferred embodiment of the present invention.

A Management Collection is a collection of nodes (systems) contained within a distributed data processing system such as the one illustrated in FIG. 1.

Figure 5:
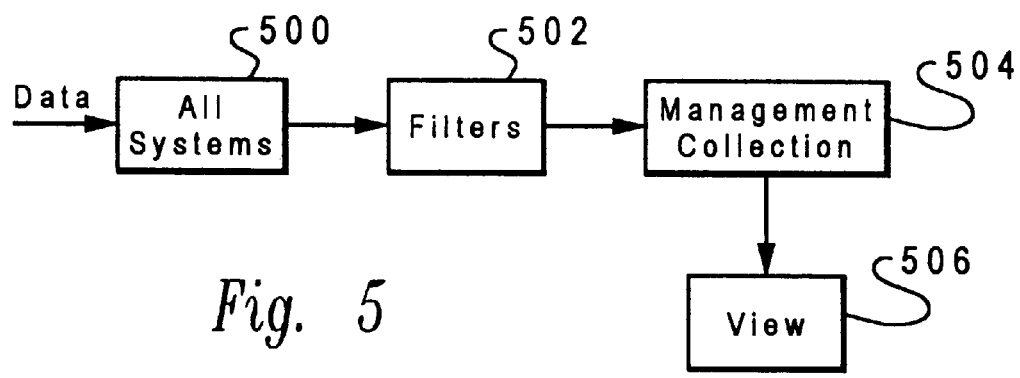
FIG. 5 is a diagram of objects employed to manage a Management Collection in accordance with a preferred embodiment of the present invention.

Referring next to FIG. 5, a diagram of objects used to manage a Management Collection is depicted in accordance with a preferred embodiment of the present invention. All Systems 500 receives information from a distributed data processing system using known protocols such as XMP. It contains all known systems at a given point in time. All Systems 500 is an instance of the class Management Collection 410. The information collected by All Systems 500 is then filtered by one or more Filters 502 and the filtered information is then stored in Management Collection 504. This information is displayed to a user by View 506. View 506 is an object employed to display the contents of Management Collection 504 to a user, typically in the form of a window containing icons.

Figure 6:
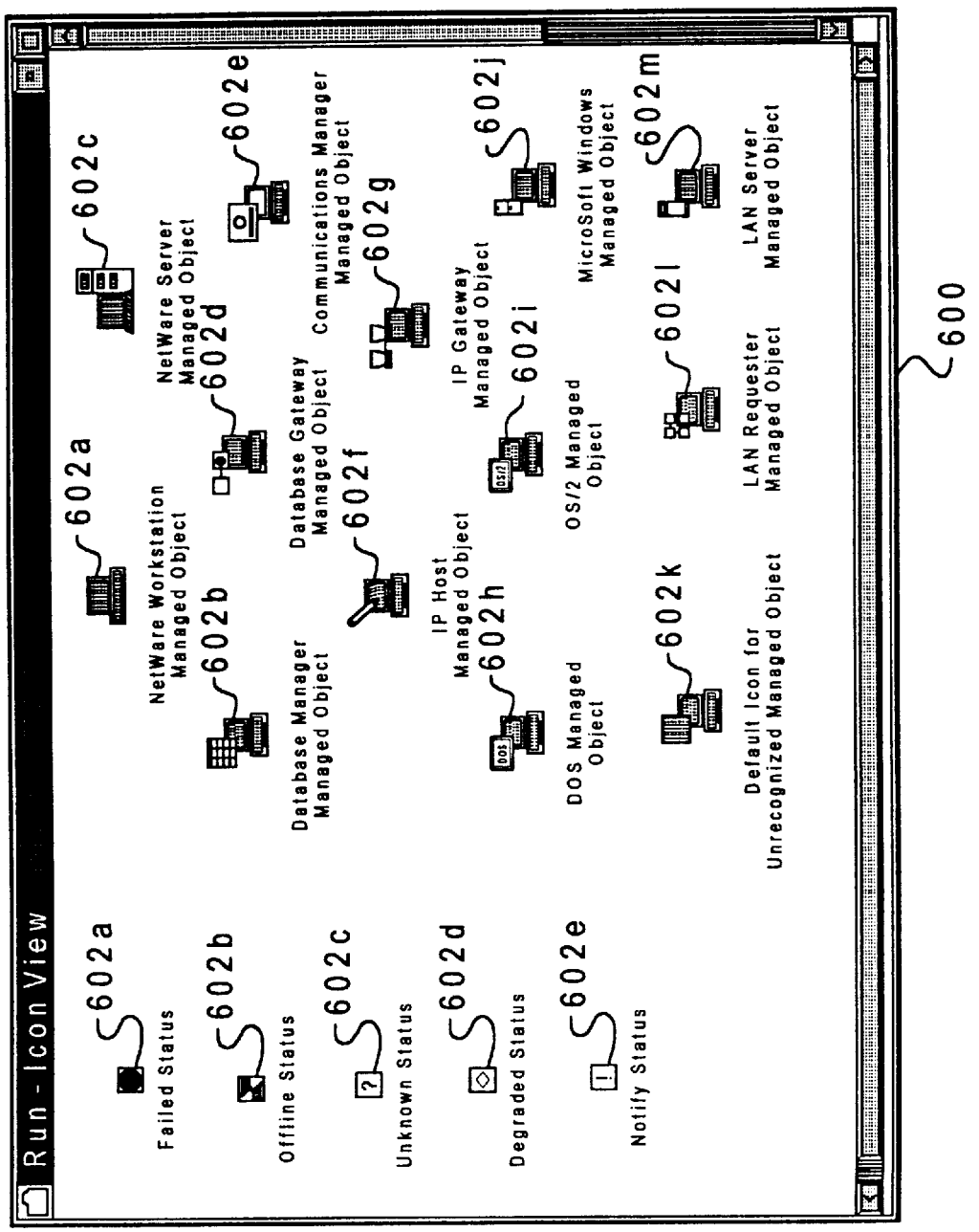
FIG. 6 is a window displayed in accordance with a preferred embodiment of the present invention.

With reference to FIG. 6, a window displayed by View 506 is illustrated in accordance with a preferred embodiment of the present invention. Window 600 displays a Management Collection containing Systems 602a–602m and statuses 604a–604e. Icons indicating the status of the systems are displayed in association with each system icon.

Figure 7:
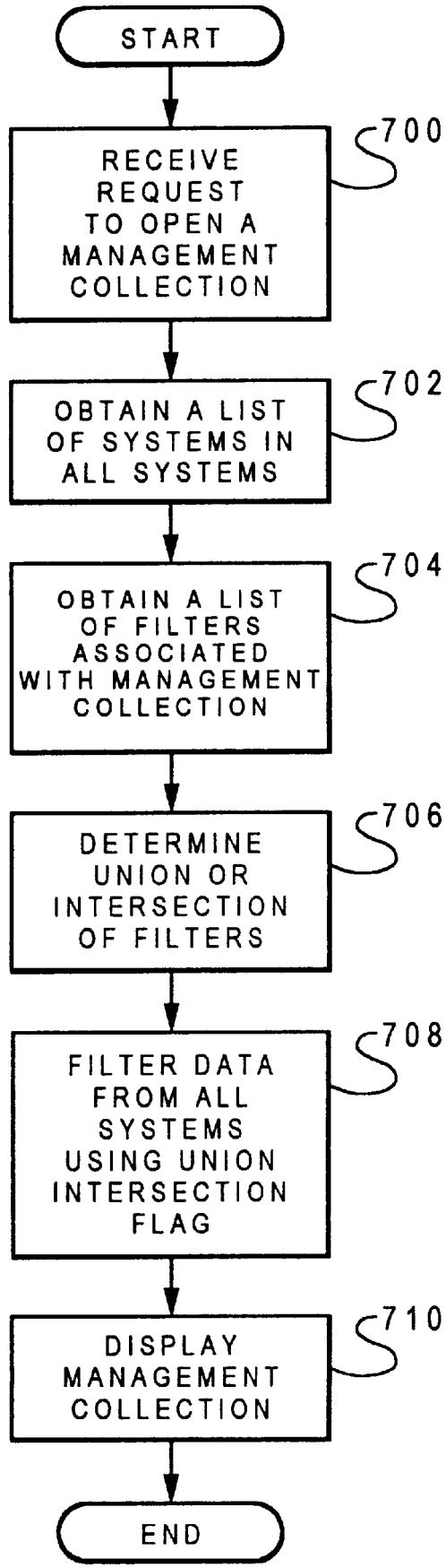
FIG. 7 is a flow chart of a process for displaying the contents of a Management Collection to a user is illustrated in accordance with a preferred embodiment of the present invention.

Referring next to FIG. 7, a flow chart of a process for displaying the contents of a Management Collection to a user is illustrated in accordance with a preferred embodiment of the present invention. The process begins by receiving a request from a user to open a Management Collection (step 700). In response to receiving a request to opening a Management Collection, the process queries All Systems to obtain a list of systems present in All Systems (step 702).

Next, the process queries an .INI file to obtain a list of filters associated with the selected Management Collection (step 704). Although the depicted embodiment stores data in a standard OS/2 .INI file, data may be stored in other ways, such as a database or some other type of file. "OS/2" is a trademark of International Business Machines Corporation. The process also queries the .INI file to determine if the Management Collection is to contain systems that are the union (systems that pass at least one filter) or the intersection (systems that pass all filters) of any filters associated with the Management Collection (step 706). Whether a union or intersection function is to be formed is indicated by either a union or intersection flag being set in the .INI file for a particular Management Collection. This is set by the user in the Management Collection creation process. Although the depicted embodiment employs the use of union and intersection logic, other combinations of logic may be employed in accordance with a preferred embodiment of the present invention. The process then filters data from All Systems based on whether a union or intersection flag is set (step 708). The process then opens a window to display the Management Collection (step 710). The window is populated by placing a shadow object for each system in the filtered list into the window for the Management Collection. A "shadow" is a reflection of the original object that receives refreshes of information from the original object, since the true objects are all contained in the All Systems container.

Figure 8:
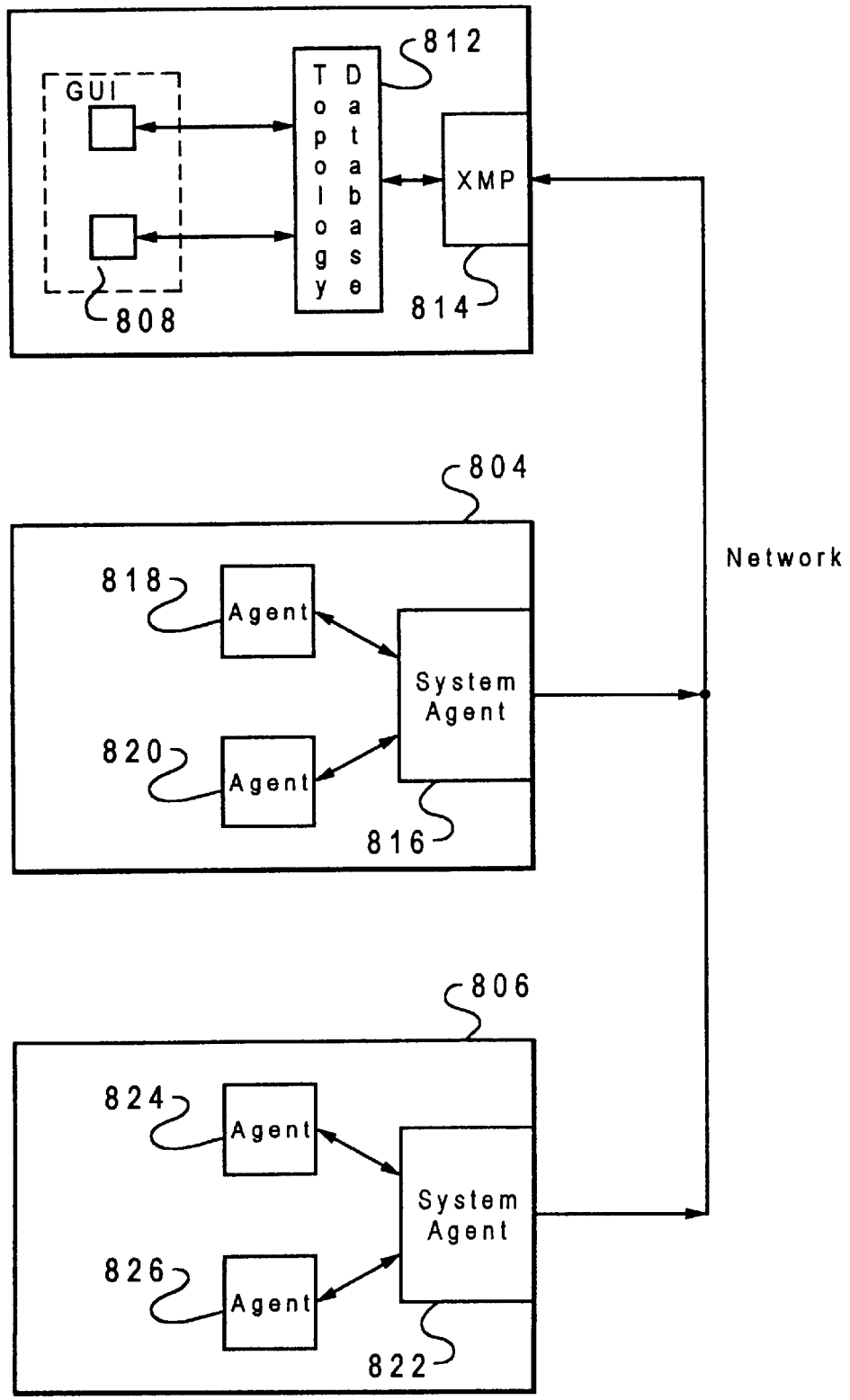
FIG. 8 is a data flow diagram illustrating the flow of information within a distributed data processing system in accordance with a preferred embodiment of the present invention.

Referring now to FIG. 8, a data flow diagram illustrating the flow of information within a distributed data processing system in accordance with a preferred embodiment of the present invention. Network 800, a distributing data processing system, includes computers 802, 804, 806. Computer 802 is a managing system while computers 804 and 806 are managed computers. Computer 802 includes Filters 808, which obtain a list of systems from All Systems 810. Filters 808 obtain information about systems in the list obtained from All System by querying topology database 812, which is a database created for use with XMP 814. Computer 804 includes system agent 816, agent processes 818, and 820. Similarly, computer 806 includes system agent 822, agent processes 824, and 826. When computer 802 is initialized, it issues a message to the network requesting other computers to return a status report to computer 802. Data collection by computer 802 is accomplished using XMP 814, which is a known network protocol. System agents 816 and 822 on computers 804 and 806, respectively, receive the request from computer 802. In response to receiving a request for status information, each system agent, system agent 816 and 822, queries agent processes, agent processes 818, 820, 824, and 826, for status information. These agent processes return information to the system agents. The returned information includes information, such as status of the system, configuration, and return codes.

In response to receiving information from an agent, the system agent places the information into a form to return to the managing computer, 802. In response to receiving information from computers 804 and 806, computer 802 adds the data to topology database 812. Thereafter, computer 802 monitors the network for updates from computers 804 and 806. System agents 816 and 822 report any changes in one of the agent processes to computer 802. In response to receiving an update, computer 802 updates topology database 812. Filters 808 and 810 may query topology database 812. Filters go to topology database directly for information about the systems, computers 804 and 806, in network 800, such as installed software or status.

Figure 9:
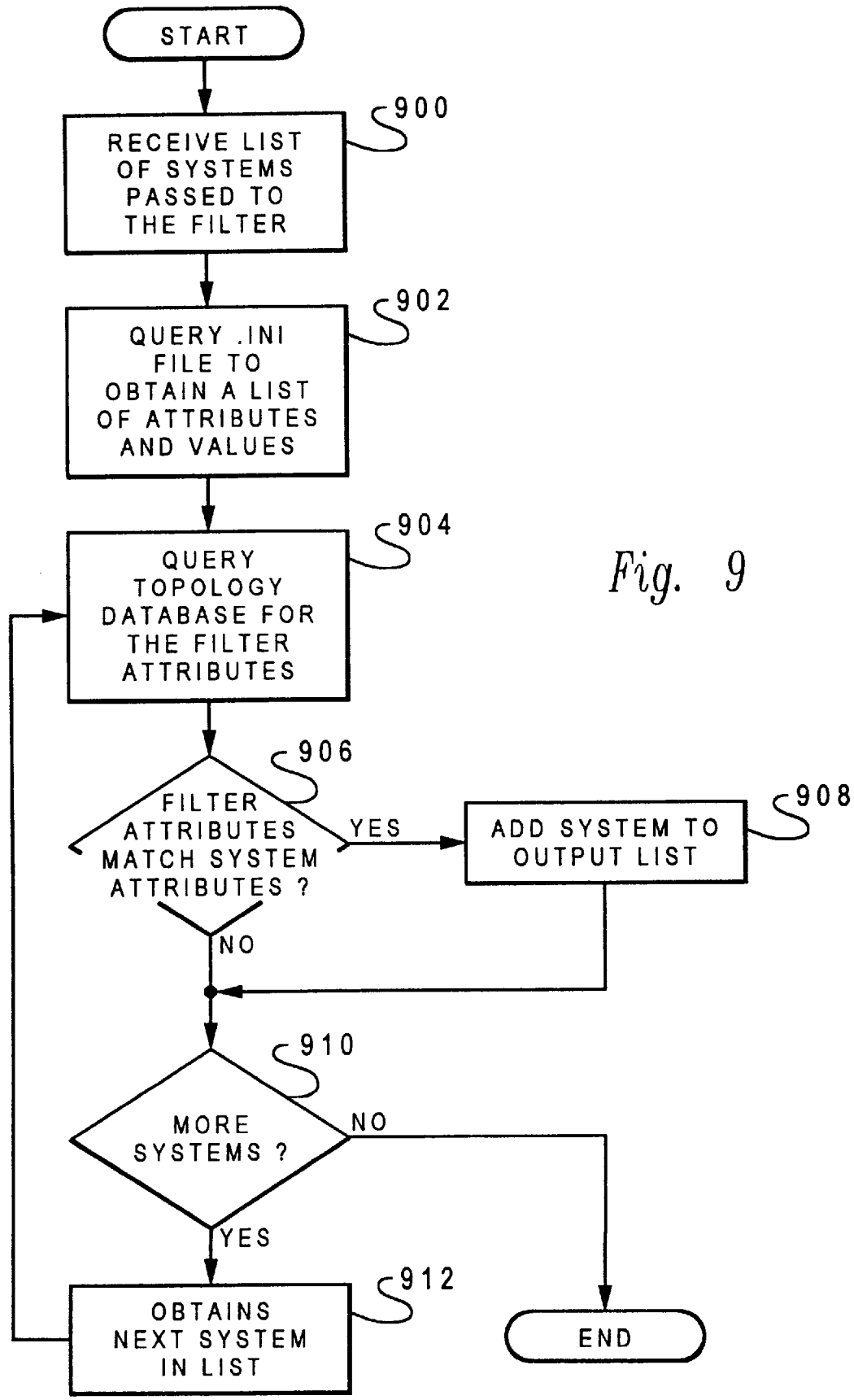
FIG. 9 is a flow chart of a process for filtering data in a filter object is depicted in accordance with a preferred embodiment of the present invention.

Referring next to FIG. 9, a flow chart of a process for filtering data in a filter object is depicted in accordance with a preferred embodiment of the present invention. The process begins by receiving a list of all systems passed to the filter from All Systems collection (step 900). The process then queries the .INI file to obtain filter attributes and their acceptable values for the filter (step 902). For each system within the list passed to the filter, the topology database is queried for the system attributes (step 904). The process then determines whether the filter attributes match the system attributes (step 906).

If the filter attributes match the system attributes the process then adds the system to an output list (step 908). The output list is used to populate the contents of the Management Collection that will be displayed to the user. The process then determines whether more systems are present for filtering by the filter object (step 910). If additional systems are present, then the process then obtains the next system in the list (step 912) and returns to step 904.

Referring again to step 906, if the filter attributes do not match the system attributes the process then proceeds to step 910 as described above.

Figure 10:
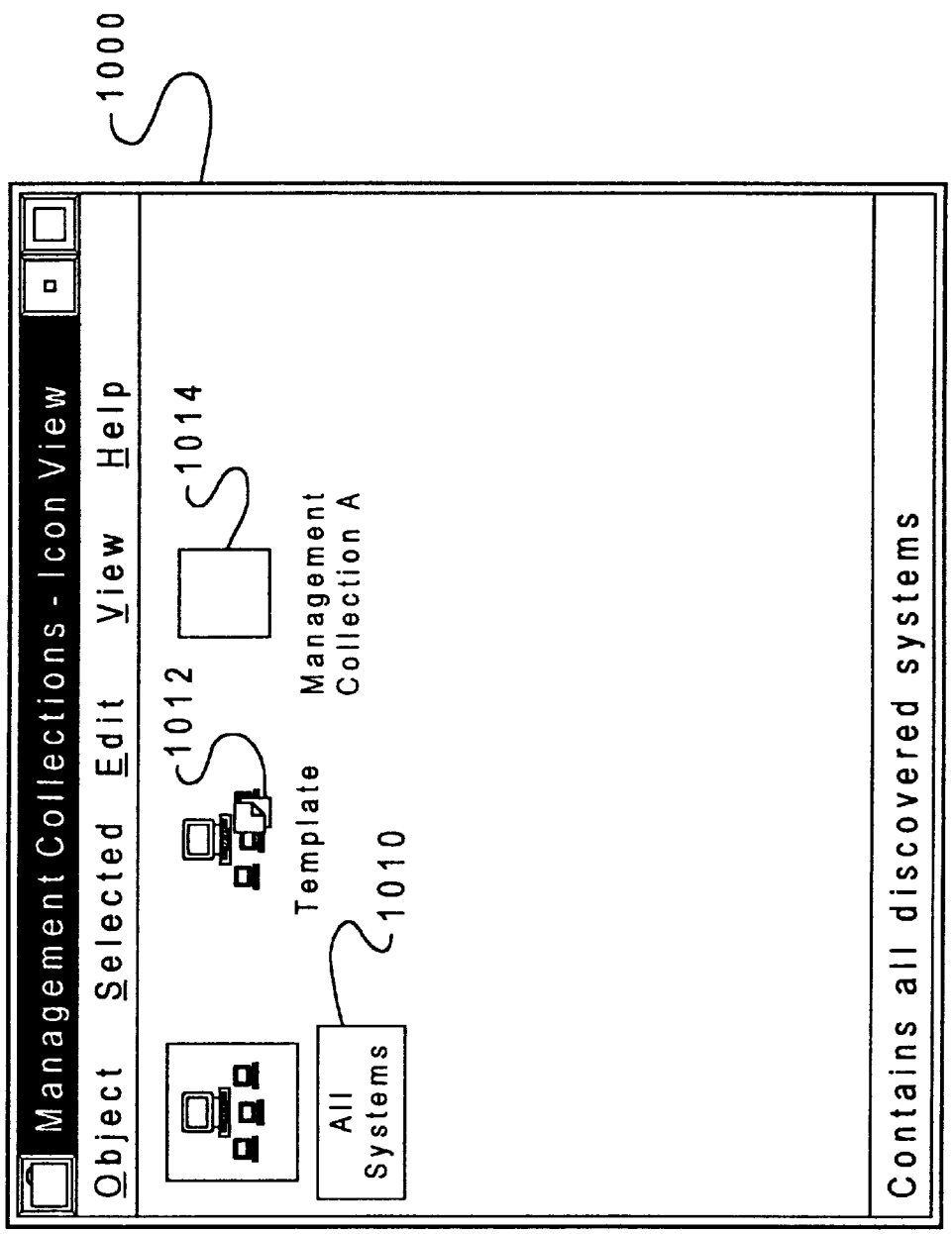
FIG. 10 is a window depicted in accordance with a preferred embodiment of the present invention.

Referring to FIG. 10, a window 1000 is depicted in accordance with a preferred embodiment of the present invention. Window 1000 includes All Systems 1010, template 1012, and Management Collection 1014. Template 1012 maybe used to create new Management Collections in accordance with a preferred embodiment of the present invention.

Figure 11:
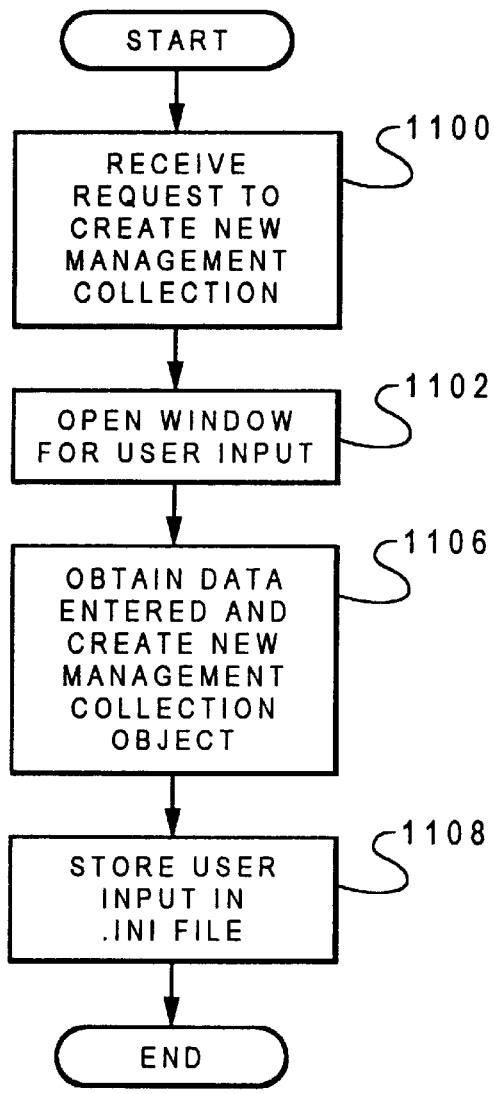
FIG. 11 is a process for creating a new Management Collection in accordance with a preferred embodiment of the present invention.

With reference now to FIG. 11, a process for creating a new Management Collection in accordance with a preferred embodiment of the present invention. The process begins by receiving a request from a user to create a new Management Collection (step 1100) opens a window for user input (step 1102). User input may take the forms, such as attributes, status, configuration, modules, or serial numbers. The user also inputs filters for use with the Management Collection, whether the filtering is to be formed on a union or intersection and a name for the new Management Collection. In response to completion of user input, the process obtains the data entered by the user and creates a new Management Collection object (step 1106). Next, the process stores all data entered about the object such as the filters selected by the user, the union/intersection flag, and the name for the new Management Collection object into the .INI file (step 1108) and the process terminates thereafter.

Figure 12:
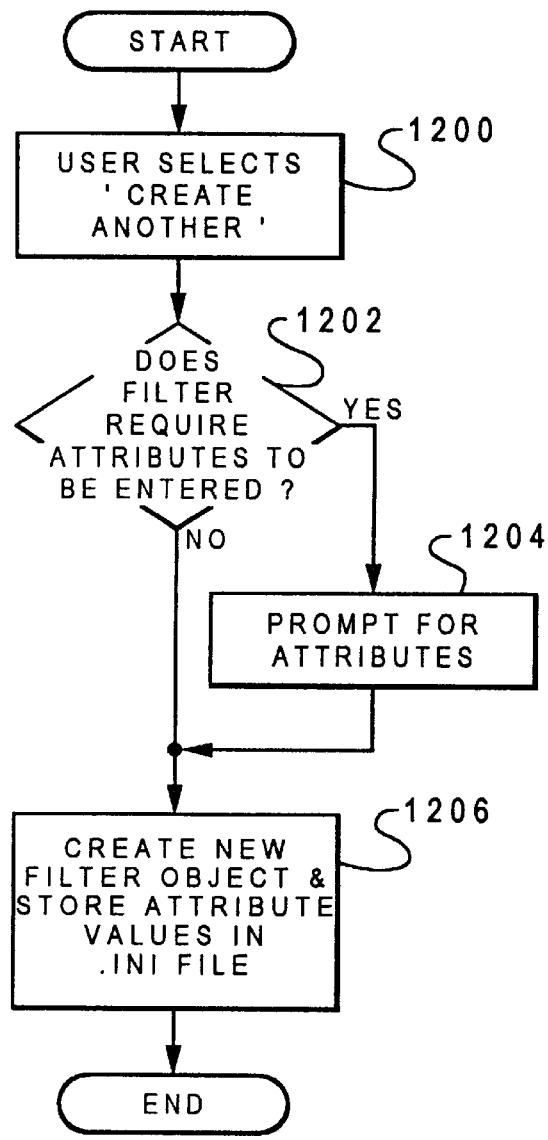
FIG. 12 is a flow chart of a process for creating a new filter object is depicted in accordance with a preferred embodiment of the present invention.

With reference next to FIG. 12, a flow chart of a process for creating a new filter object is depicted in accordance with a preferred embodiment of the present invention. The process begins when the user chooses the "create another" action on a filter object determining whether the new filter will query the same attributes as an existing filter (step 1200). The process then determines whether the filter requires attributes to be entered (step 1202). If the filter does not require attributes to be entered, the process creates a new filter object and the stores the attribute values in the .INI file (step 1204) with the process terminating thereafter. Otherwise, the process then prompts the user to enter attribute values for the new filter (step 1206). After the user has entered attributes for the new filter, the process then creates a new filter object and the stores the attribute values in the .INI file (step 1204) with the process terminating thereafter.

Although the depicted embodiment involves systems within a distributed data processing system, the present invention may be applied to other objects such as objects in an object oriented environment or any other type of data collection having different attributes that a user may want to manage in subsets.

While the invention has been particularly shown and described with reference to a preferred embodiment, it will be understood by those skilled in the art that various changes in form and detail may be made therein without departing from the spirit and scope of the invention.

What is claimed is:

1. A method for more efficient data processing by use of generic filter object plug ins which require nominal modifications to underlying data processing devices, said method comprising the steps of:

creating one or more filter objects whose characteristics include the ability of accepting objects having both routines and data from one or more object sources, filtering said accepted objects on the basis of defined filter characteristics, and delivering said filtered objects to one or more object sinks;

creating a first data collection object for collecting data from one or more defined data sources, creating objects containing routines and said collected data, and delivering said created objects containing said routines and said collected data to said created one or more filter objects;

creating a second data collection object for collecting objects having both routines and data from said one or more filter objects and containing and delivering said collected objects to one or more other defined object sinks; and interposing at least one of said created filter objects into a data network which includes a plurality of defined data sources and a plurality of defined objects sinks utilizing said first data collection objects and said second data collection object such that more efficient data processing by use of generic filter object plug ins which required nominal modifications to underlying data processing devices is achieved.

2. The method of claim 1, further comprising the step of thereafter utilizing contents of said second data collection object to represent information based upon said received filtered data.

3. The method of claim 2, wherein said step of thereafter utilizing the contents further comprises the step of utilizing the contents of said second data collection object to represent the status of data network resources.

4. The method of claim 3, wherein said step of thereafter utilizing the contents further comprises the step of representing the status of data network resources utilizing graphical objects.

5. A system for more efficient data processing by use of generic filter object plug ins which require nominal modifications to underlying data processing devices, said system comprising:

means for creating one or more filter objects whose characteristics include the ability of accepting objects having both routines and data from one or more object sources, filtering said accepted objects on the basis of defined filter characteristics, and delivering said filtered objects to one or more object sinks;

means for creating a first data collection object for collecting data from one or more defined data sources, creating objects containing routines and said collected data, and delivering said created objects containing said routines and said collected data to said created one or more filter objects;

means for creating a second data collection object for collecting objects having both routines and data from said one or more filter objects and containing and delivering said collected objects to one or more other defined object sinks; and means for interposing at least one of said created filter objects into a data network which includes a plurality of defined data sources and a plurality of defined object sinks utilizing said first data collection object and said second data collection object such that more efficient data processing by use of generic filter object plug ins which require nominal modifications to underlying data processing devices is achieved.

6. The system of claim 5, further comprising means for thereafter utilizing contents of said second data collection object to represent information based upon said received filtered data.

7. The system of claim 6, wherein said means for thereafter utilizing the contents further comprises means for utilizing the contents of said second data collection object to represent the status of data network resources.

8. The system of claim 7, wherein said means for thereafter utilizing the contents further comprises means for representing the status of data network resources utilizing graphical objects.

9. A program product for more efficient data processing by use of generic filter object plug ins which require nominal modifications to underlying data processing devices, said program product comprising:

means for creating one or more filter objects whose characteristics include the ability of accepting objects having both routines and data from one or more object sources, filtering said accepted objects on the basis of defined filter characteristics, and delivering said filtered objects to one or more object sinks;

means for creating a first data collection object for collecting data from one or more defined data sources, creating objects containing routines and said collected data, and delivering said created objects containing said routines and said collected data to said created one or more filter objects;

means for creating a second data collection object for collecting objects having both routines and data from said one or more filter objects and containing and delivering said collected objects to one or more other defined object sinks;

means for interposing at least one of said created filter objects into a data network which includes a plurality of defined data sources and a plurality of defined object sinks utilizing said first data collection object and said second data collection object such that more efficient data processing by use of generic filter object plug ins which require nominal modifications to underlying data processing devices is achieved; and signal bearing means bearing said means for creating one or more filter objects, said means for creating a first data collection object, said means for creating a second data collection object, and said means for interposing.

10. The program product of claim 9, wherein said signal bearing means further comprises transmission media.

11. The program product of claim 9, wherein said signal bearing means further comprises recordable media.

12. The program product of claim 9, further comprising means for thereafter utilizing contents of said second data collection object to represent information based upon said received filtered data.

13. The program product of claim 12, wherein said means for thereafter utilizing the contents further comprises means for utilizing the contents of said second data collection object to represent the status of data network resources.

14. The program product of claim 13, wherein said means for thereafter utilizing the contents further comprises means for representing the status of data network resources utilizing graphical objects.

* * * * *